US012540755B2

(12) United States Patent
Gullapalli et al.

(10) Patent No.: US 12,540,755 B2
(45) Date of Patent: Feb. 3, 2026

(54) HEAT EXCHANGER TUBES AND TUBE ASSEMBLY CONFIGURATIONS

(71) Applicant: Rheem Manufacturing Company, Atlanta, GA (US)

(72) Inventors: Satya Gullapalli, Oxnard, CA (US); Bruce Hotton, Oxnard, CA (US); Juan Garcia, Oxnard, CA (US); Amin Akbarimonfared, Oxnard, CA (US); Juan Carlos Montanez, Oxnard, CA (US); Kevin Williams, Oxnard, CA (US)

(73) Assignee: Rheem Manufacturing Company, Atlanta, GA (US)

( * ) Notice: Subject to any disclaimer, the term of this patent is extended or adjusted under 35 U.S.C. 154(b) by 544 days.

(21) Appl. No.: 17/967,479

(22) Filed: Oct. 17, 2022

(65) Prior Publication Data
US 2023/0030298 A1 Feb. 2, 2023

Related U.S. Application Data

(63) Continuation of application No. 16/593,516, filed on Oct. 4, 2019, now Pat. No. 11,499,747.

(51) Int. Cl.
*F28F 1/30* (2006.01)
*F24H 1/14* (2022.01)
(Continued)

(52) U.S. Cl.
CPC ............. *F24H 1/145* (2013.01); *F24H 9/02* (2013.01); *F28F 1/20* (2013.01); *F28F 1/30* (2013.01);
(Continued)

(58) Field of Classification Search
CPC ... F24H 1/145; F24H 9/02; F24H 1/00; F24H 1/40; F28F 1/20; F28F 1/30; F28F 1/36; F28F 2215/04; Y10S 165/329
See application file for complete search history.

(56) References Cited

U.S. PATENT DOCUMENTS

| 1,705,491 A | 3/1929 | Murray |
| 2,828,723 A | 4/1958 | Miller |
| (Continued) | | |

FOREIGN PATENT DOCUMENTS

| DE | 2245357 A | * 3/1973 | ............. F24H 1/145 |
| EP | 0305702 B | 3/1989 | |
| (Continued) | | | |

OTHER PUBLICATIONS

Ray pack Brochure, "X94 Professional High Efficiency Pool and Spa Heater" Nov. 15, 2018, 8 pages.
(Continued)

*Primary Examiner* — Gregory A Wilson
(74) *Attorney, Agent, or Firm* — Eversheds Sutherland (US) LLP

(57) ABSTRACT

Embodiments include various water heaters. In one example, a water heater includes a burner, an exhaust vent, a corrugated baffle having a first slit having a first length and a second slit having a second length that is less than the first length, and a heat exchanger. The heat exchanger includes a first set of heat exchanger tubes arranged in a first row, and a second set of heat exchanger tubes arranged in a second row, the second set of heat exchanger tubes having a third tube having a first angled surface and a second angled surface, where the first angled surface and the second angled surface together form a fin. The third tube can be arranged such that the fin is disposed at least partially between the first curved outer surface and the second curved outer surface.

17 Claims, 12 Drawing Sheets

(51) Int. Cl.
*F24H 9/02* (2006.01)
*F28F 1/20* (2006.01)
*F24H 9/00* (2022.01)

(52) U.S. Cl.
CPC ........ *F24H 9/0026* (2013.01); *F28F 2215/04* (2013.01); *Y10S 165/329* (2013.01)

(56) References Cited

U.S. PATENT DOCUMENTS

| | | | |
|---|---|---|---|
| 3,160,145 A | 12/1964 | Miller | |
| 3,523,458 A | 8/1970 | Boothroyd | |
| 3,534,712 A * | 10/1970 | Reynolds | F24H 1/38 |
| | | | 122/225 R |
| 4,095,648 A | 6/1978 | Shipes | |
| 4,550,689 A | 11/1985 | Wolter | |
| 4,721,068 A * | 1/1988 | Bassols Rheinfelder | |
| | | | F24H 1/40 |
| | | | 165/181 |
| 5,009,263 A | 4/1991 | Seshimo et al. | |
| 5,163,508 A * | 11/1992 | Hamos | F24H 9/0026 |
| | | | 165/181 |
| 5,201,807 A | 4/1993 | Liljenberg et al. | |
| 6,050,328 A | 4/2000 | Shikazono et al. | |
| 6,253,715 B1 | 7/2001 | Takubo et al. | |
| 6,948,455 B2 * | 9/2005 | Ferguson | F28D 7/08 |
| | | | 122/367.3 |
| 7,650,933 B2 * | 1/2010 | Gilbert | F24H 9/0026 |
| | | | 165/134.1 |
| 10,288,315 B2 * | 5/2019 | Cui | F24H 9/0026 |
| 10,976,048 B2 | 4/2021 | Akbarimonfared et al. | |
| 11,499,747 B2 * | 11/2022 | Gullapalli | F28F 1/20 |
| 2013/0228321 A1 | 9/2013 | Williams et al. | |
| 2016/0273850 A1 * | 9/2016 | Okamoto | F28F 1/32 |
| 2017/0167753 A1 * | 6/2017 | Russell | F24H 1/403 |
| 2017/0356691 A1 * | 12/2017 | Willis | F28F 21/086 |
| 2021/0317985 A1 | 10/2021 | Watteau et al. | |
| 2022/0074669 A1 | 3/2022 | Gullapalli et al. | |

FOREIGN PATENT DOCUMENTS

| | | | | |
|---|---|---|---|---|
| KR | 570288 B1 * | 4/2006 | ............ | F24H 1/40 |
| RU | 2000518 C1 | 9/1993 | | |
| RU | 2266486 C1 | 12/2005 | | |
| WO | 200175384 A1 | 10/2001 | | |
| WO | WO-2005064259 A1 * | 7/2005 | ............ | F24H 1/40 |
| WO | 2008138988 A1 | 11/2008 | | |

OTHER PUBLICATIONS

PCT, "International Search Report" Application No. PCT/US2020/053895, mailed Jan. 21, 2021, 2 pages.

* cited by examiner

HEAT EXCHANGER TUBES AND TUBE ASSEMBLY CONFIGURATIONS

TECHNICAL FIELD

Embodiments described herein relate generally to water heaters with heat exchanger (HX) tubes, and more particularly to HX tubes comprising a bent fin.

BACKGROUND

Heat exchangers, such as ones used in water heating systems and other similar devices control or alter thermal properties of one or more fluids, such as water passing through the heat exchanger. In some cases, tubes (also called heat exchanger tubes or HX tubes) disposed within these devices are used to transfer a fluid through a volume of space, thereby altering the thermal properties of the fluid. The temperature of the fluid can increase or decrease, depending on how the device is configured.

SUMMARY

In general, in one aspect, the disclosure relates to a water heater comprising a burner; an exhaust vent; a baffle; and a heat exchanger configured to receive heated air from the burner, the heat exchanger comprising: two rows of heat exchanger tubes, each row comprising a plurality of heat exchanger tubes, wherein at least one of the heat exchanger tubes comprises: a tube; and a plurality of fins on the exterior of the tube positioned concentrically around the tube, wherein an outer circumference of each fin of the plurality of fins comprises a pattern of bends. In some embodiments, a first row of heat exchanger tubes in the two rows of heat exchanger tubes is in contact with a second row of heat exchanger tubes and the second row of heat exchanger tubes is in contact with the baffle. In some embodiments, the baffle is corrugated such that it comprises a plurality of grooves and ridges. The baffle can also comprise a plurality of slits that run along at least part of the plurality of grooves in the baffle. In some embodiments, at least two grooves of the plurality of grooves comprise at least two slits and, in some embodiments, at least one slit is a different length than at least one other slit. The baffle can also be solid at the ridges of the baffle. In an embodiment, each heat exchanger tube in the second row of heat exchanger tubes can fit into a groove of the plurality of grooves. In some embodiments, the thermal efficiency of the water heater is 83% to 84%. In some embodiments, the dimensions of the water heater are less than 4 feet by 4 feet by 4 feet, less than 3 feet by 3 feet by 3 feet, or less than 2 feet by 2 feet by 2 feet. In some embodiments, the thermal efficiency of the water heater is 83% to 84% and the dimensions of the water heater are less than 2 feet by 2 feet by 2 feet. In some embodiments, the heat exchanger tubes can be made of copper or copper nickel alloy. In some embodiments, a first row of the two rows of heat exchanger tubes has 9 heat exchanger tubes and a second row of the two rows of heat exchanger tubes 8 heat exchanger tubes. In some embodiments, the water heater is a non-condensing water heater. In certain embodiments, a first row of the two rows of heat exchanger tubes comprises a first pattern of bends on the outer circumference of the fins and a second row of the two rows of heat exchanger tubes comprises a second pattern of bends on the outer circumference of the fins. In specific embodiments, the first pattern of bends comprises four flat or concave areas and the second pattern of bends comprises three flat or concave areas; the first pattern of bends comprises two side bends located on opposite sides of the first row of heat exchanger tubes such that adjacent heat exchanger tubes lay flat against each other and a corner bend is located next to each side bend; and/or the second pattern of bends comprises two side bends located on opposite sides of the second row of heat exchanger tubes such that adjacent heat exchanger tubes lay flat against each other. In some embodiments, the pattern of bends of one fin do not contact the pattern of bends of an adjacent fin of the plurality of fins on a same heat exchanger tube. In certain embodiments, the plurality of fins is formed from a single band of metal that runs helically around the tube. In some embodiments, all of the heat exchanger tubes comprise a plurality of bends. In some embodiments, a plurality of the heat exchanger tubes comprise bends. In some embodiments, one or more of the heat exchanger tubes do not comprise bends.

In general, in another aspect, the disclosure relates to a heat exchanger tube comprising a plurality of fins on an exterior of the heat exchanger tube and circumscribing the heat exchanger tube, wherein the outer circumference of each fin of the plurality of fins comprises a pattern of bends, wherein the pattern of bends is the same for each fin. In some embodiments, the bends to not touch another fin. In some embodiments, there are two, three, four, or five patterns of bends. In some embodiments, each fin is bent 45° to 90°. In embodiments, the tube and/or fins are made copper and/or copper nickel. In some embodiments, and tube and/or fins are not made of steel. In some embodiments, the outer circumference of the fins of the HX tubes where the bends are located can be flat or concave. In some embodiments, the plurality of fins on the tube refers to individual fins that are wrapped around the circumference of the tube. In other embodiments the plurality of fins on the tube refers to a single piece of spiraling metal that is wrapped around the tube creating the fins. In some embodiments the fins are extruded from the same tube in a spiral fashion. In some embodiments, the pattern of bends in the plurality of fins that create a flat or concave area are bent at an angle. In some embodiments, the bends are positioned at a certain location between the tube and the exterior circumference of the fin. For example, the bend can be positioned such that the middle of the bend falls between 10%-80% of the distance between the circumference of the fin and the tube (width of the fin). In some embodiments, the direction of the bends in the fin can vary such that one bend is oriented in a first direction and a second bend is oriented in a different or opposite direction, a different angle, or positioned at a different width.

These and other aspects, objects, features, and embodiments will be apparent from the following description and the appended claims.

BRIEF DESCRIPTION OF THE DRAWINGS

The drawings illustrate only example embodiments of water heaters with HX tubes comprising bent fins and are therefore not to be considered limiting in scope, as water heaters with HX tubes comprising bent fins may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION OF EXAMPLE EMBODIMENTS

Figure 1:
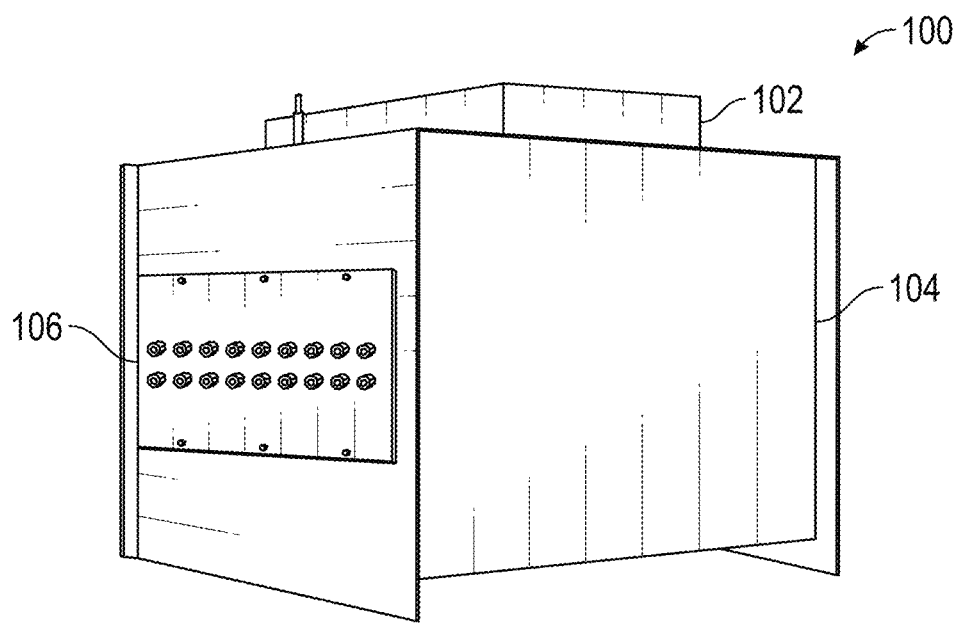
FIG. 1 is an example pool water heater with a square burner.

The example embodiments discussed herein are directed to systems, methods, and devices for water heaters and HX tube assembly configurations within a heat exchanger of the water heater. Example embodiments can be directed to any of a number of thermal transfer devices used in a variety of water heaters, including but not limited to pool water heaters, as well as heat exchangers for other systems such heating, ventilation and air conditioning (HVAC) systems. The configuration of the example water heaters described herein allows for the compact design of a water heater, such as a pool heater, as well as for the efficient heating of water using lower grade materials, such as copper or copper alloys, in the heat exchanger.

Example embodiments can be pre-fabricated or specifically generated (e.g., by shaping a malleable body) for a particular heat exchanger and/or environment. Example embodiments can have standard or customized features (e.g., shape, size, features on the inner surface, pattern, configuration). Therefore, example embodiments described herein should not be considered limited to creation or assembly at any particular location and/or by any particular person.

The water heater (or components thereof) described herein can be made of one or more of a number of suitable materials and/or can be configured in any of a number of ways to allow the water heater (or devices (e.g., HVAC) in which HX tubes are disposed) to meet certain standards and/or regulations while also maintaining reliability of the water heater, regardless of the one or more conditions under which the water heater can be exposed. Examples of such materials can include, but are not limited to, aluminum, stainless steel, ceramic, fiberglass, glass, copper, and/or copper nickel for example.

As discussed above, heat exchangers can be subject to complying with one or more of a number of standards, codes, regulations, and/or other requirements established and maintained by one or more entities. Examples of such entities can include, but are not limited to, the American Society of Mechanical Engineers (ASME), the Tubular Exchanger Manufacturers Association (TEMA), the American Society of Heating, Refrigeration and Air Conditioning Engineers (ASHRAE), Underwriters' Laboratories (UL), the National Electric Code (NEC), the Institute of Electrical and Electronics Engineers (IEEE), and the National Fire Protection Association (NFPA). Example water heaters allow a heat exchanger to continue complying with such standards, codes, regulations, and/or other requirements. In other words, example water heaters, when used in a heat exchanger, do not compromise compliance of the heat exchanger with any applicable codes and/or standards.

Any example HX tubes or baffles, or portions thereof, described herein can be made from a single piece (e.g., as from a mold, injection mold, die cast, 3-D printing process, extrusion process, stamping process, crimping process, and/or other prototype methods). In addition, or in the alternative, example HX tubes or baffles (or portions thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

As used herein, a "coupling feature" can couple, secure, fasten, abut, and/or perform other functions aside from merely coupling. A coupling feature as described herein can allow one or more components of a HX tube to become coupled, directly or indirectly, to another portion (e.g., an inner surface) of the HX tube. A coupling feature can include, but is not limited to, a snap, a clamp, a portion of a hinge, an aperture, a recessed area, a protrusion, a slot, a spring clip, a tab, a detent, a compression fitting, and mating threads. One portion of an example HX tube can be coupled to a component of a heat exchanger and/or another portion of the HX tube by the direct use of one or more coupling features.

In addition, or in the alternative, a portion of an example HX tube can be coupled to another component of a heat exchanger and/or another portion of the HX tube using one or more independent devices that interact with one or more coupling features disposed on a component of the HX tube. Examples of such devices can include, but are not limited to, a weld, a pin, a hinge, a fastening device (e.g., a bolt, a screw, a rivet), epoxy, adhesive, and a spring. One coupling feature described herein can be the same as, or different than, one or more other coupling features described herein. A complementary coupling feature as described herein can be a coupling feature that mechanically couples, directly or indirectly, with another coupling feature.

Any component described in one or more figures herein can apply to any other figures having the same label. In other words, the description for any component of a figure can be considered substantially the same as the corresponding component described with respect to another figure. For any figure shown and described herein, one or more of the components may be omitted, added, repeated, and/or substituted. Accordingly, embodiments shown in a particular figure should not be considered limited to the specific arrangements of components shown in such figure.

Example embodiments of water heaters will be described more fully hereinafter with reference to the accompanying drawings, in which example embodiments of water heaters are shown. Water heaters may, however, be embodied in many different forms and should not be construed as limited to the example embodiments set forth herein. Rather, these example embodiments are provided so that this disclosure will be thorough and complete, and will fully convey the scope of water heaters to those of ordinary skill in the art. Like, but not necessarily the same, elements (also sometimes called components) in the various figures are denoted by like reference numerals for consistency.

Terms such as "first," "second," "top," "bottom," "left," "right," "end," "back," "front," "side", "length," "width," "inner," "outer," "above", "lower", and "upper" are used merely to distinguish one component (or part of a component or state of a component) from another. Such terms are not meant to denote a preference or a particular orientation unless specified and are not meant to limit embodiments of water heaters. In the following detailed description of the example embodiments, numerous specific details are set forth in order to provide a more thorough understanding of the disclosure. However, it will be apparent to one of ordinary skill in the art that the invention may be practiced without these specific details. In other instances, well-known features have not been described in detail to avoid unnecessarily complicating the description.

Figure 2:
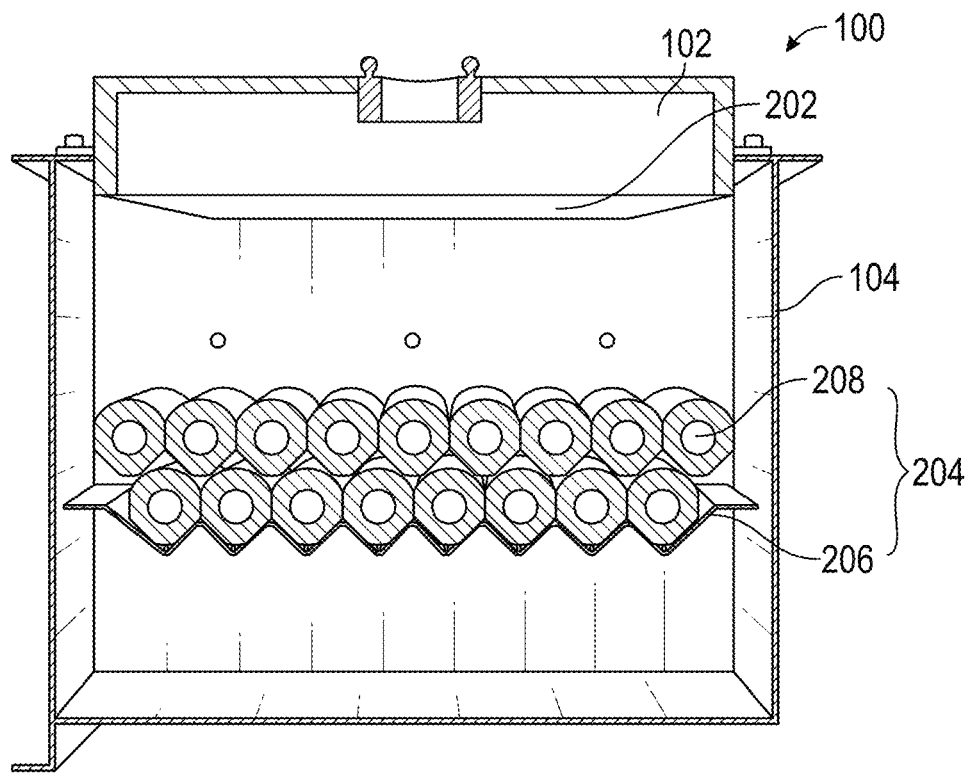
FIG. 2 is a cross-section of the pool water heater of FIG. 1.

FIG. 1 shows the exterior view of one example of a water heater 100 of the disclosure for use in a pool water heater system. The water heater 100 comprises a burner box 102, a heat exchanger compartment 104, and a manifold header 106. Not seen in this view is a manifold leader and an exhaust vent on the backside of the water heater 100. FIG. 2 is a cross section of the water heater 100 of FIG. 1. Gas and air will enter the burner box 102 and combust via the burner 202. While this example illustrates a square burner, it is understood that other shaped burners could be used, such as a circular burner. Heated fluid (e.g. gases) resulting from the combustion then flows into the heat exchanger compartment 104. Water to be heated runs into and through the heat exchanger tubes 208 from the manifold leader, is heated by the combustion fluid, and flows out of the manifold header 106. The combustion fluid passes over the outside of the heat exchanger tubes 208 such that there is no mixing of the combustion fluid and the water. The HX tubes 208 are arranged in a HX slab 204. Located under the HX slab 204 is a baffle 206 on which the HX slab 204 rests.

Figure 3:
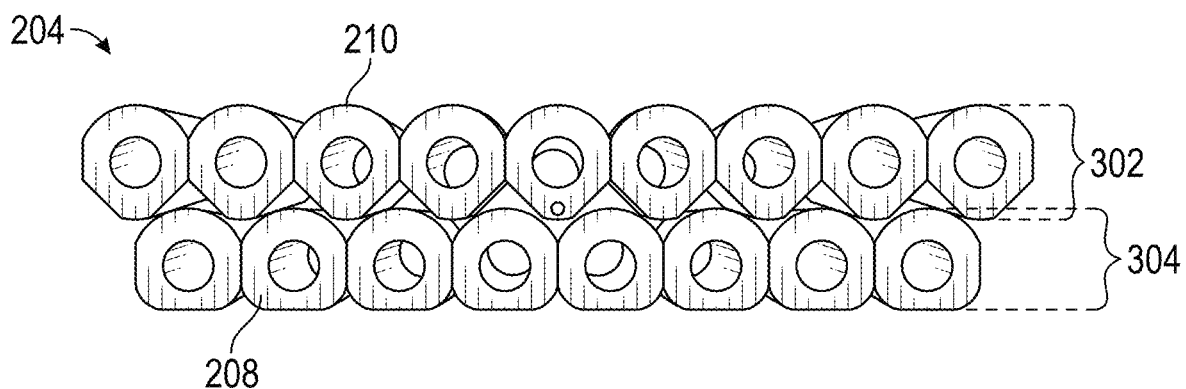
FIG. 3 is a cross-section of the heat exchanger slab from the pool water heater of FIG. 1.

FIG. 3 is a cross-section of the HX slab 204 of FIG. 2. The HX slab 204 of this example is arranged in two rows, a first row of HX tubes 302 and a second row of HX tubes 304. It is understood that the HX tubes of an HX slab could be arranged in one, two, three, four, or more rows, depending on the efficiency required from the unit. The first row of HX tubes 302 of the example comprises 9 HX tubes 210 while the second row the HX tubes 304 of the example comprises 8 HX tubes 208, but in alternate embodiment greater or fewer numbers of HX tubes can be used. The first row of HX tubes 302 is set off from or staggered with respect to the second row of HX tubes 304 such that the second row of HX tubes 304 partially fit into gaps left between the HX tubes 210 of the first row of HX tubes 302. This staggered arrangement of the HX tubes slows the flow of the combustion fluid through the heat exchanger thereby increasing the heating efficiency. Additionally, the staggered arrangement of the HX tubes allows for a more compact design of the heat exchanger.

Figure 4:
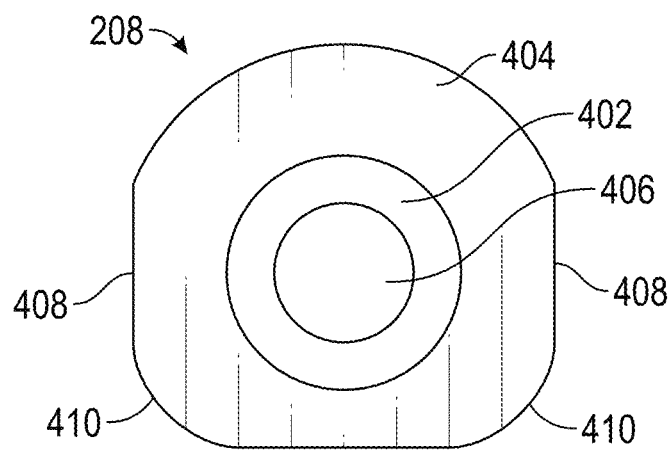
FIG. 4 is a cross-section of a heat exchanger tube in the bottom row of the heat exchanger slab of FIG. 3.

FIG. 4 shows a HX tube 208 from the second row of HX tubes 304. The HX tube 208 has a fluid impermeable tube 402 through which the water to be heated runs within the fluid passage 406. The tube 402 is surrounded by a plurality of fins 404 on the exterior of the tube 402 which extend from the tube 402 and run concentrically around the tube 402. In the example of FIG. 4, a majority of each fin is flat and defines a plane that is perpendicular to a longitudinal axis passing along the length of the tube 402. However, the outer circumference of each fin 404 in the plurality of fins comprises a pattern of bends that deviate from the plane defined by the majority of each fin. In the example of FIG. 4, the pattern of bends comprises a bend at three areas on the same position of each fin, such that the bends form three flat areas 408 and 410 that run along the length of the heat exchanger tube. Two of the flat areas are side flat areas 408 which allows each HX tube 208 to be set directly next to an adjacent HX tube 208 such that the side flat areas 408 align. HX tube 208 also comprises a bottom flat area 410.

Figure 5:
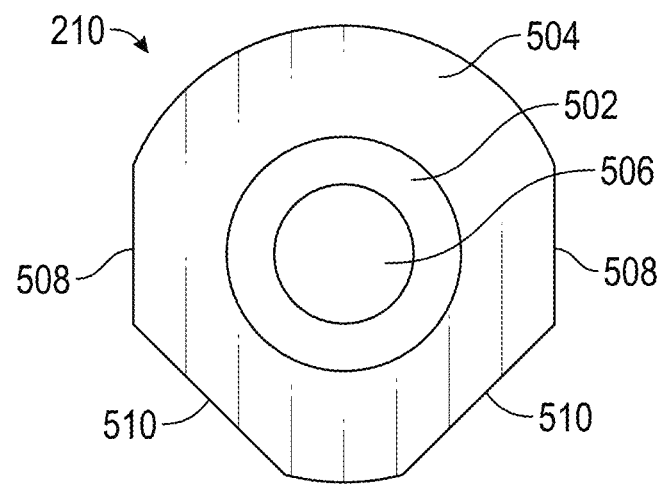
FIG. 5 is a cross-section of a heat exchanger tube in the top row of the heat exchanger slab of FIG. 3.

FIG. 5 is a HX tube 210 from the first row of HX tubes 302. The HX tube 210 has a fluid impermeable tube 502 through which the water to be heated runs within the fluid passage 506. The tube 502 is surrounded by a plurality of fins 504 on the exterior of the tube 502 which extend from the tube 502 and run concentrically around the tube 502. In the example of FIG. 5, a majority of each fin is flat and defines a plane that is perpendicular to a longitudinal axis passing along the length of the tube 502. However, the outer circumference of each fin 504 in the plurality of fins comprises a pattern of bends that deviate from the plane defined by the majority of each fin. In the example of FIG. 5, the pattern of bends comprises a bend at four areas on the same position of each fin, such that the bends form four flat areas that run longitudinally along the length of the heat exchanger tube. Two of the flat areas are side flat areas 508 which allows each HX tube 210 to be set directly next to an adjacent HX tube 210 such that the side flat areas 508 align. HX tube 210 also comprises two bottom flat edges 510 which form a V like shape at the bottom of the HX tube 210. This V like shape allows for the HX tubes 208 of the second row of HX tubes 304 to be offset from the HX tubes 210 the first row of HX tubes 302 such that the second row of HX tubes 208 fit into gaps left between the HX tubes 210 of the first row of HX tubes 302. As the water moves through the HX tubes 208 and HX tubes 210 heat is transferred from the combustion fluid flowing over the exterior of the HX tubes into the fins 404, 504 and/or tubes 402, 502 and then into the water running through the tubes 402, 502, thereby heating the water.

Figure 8:
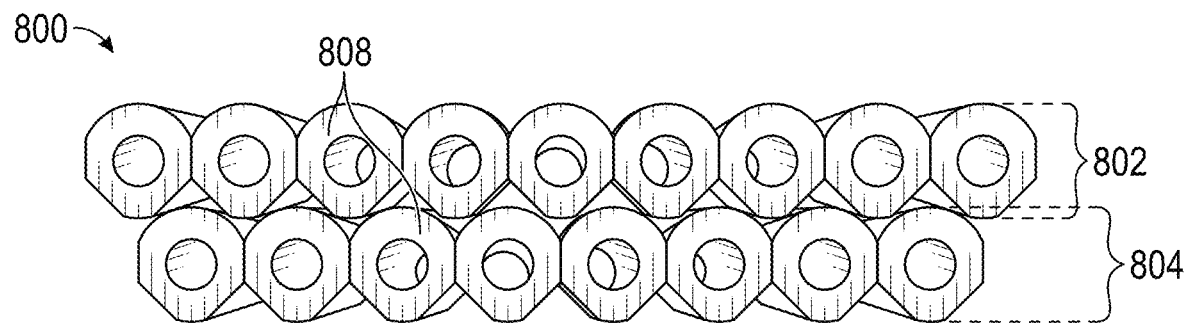
FIG. 8 is a cross-section of the heat exchanger slab from the pool water heater of FIG. 6.

FIG. 8 is a cross-section of an example HX slab 800. The HX slab 800 of this example is arranged in two rows, a first row of HX tubes 802 and a second row of HX tubes 804. The first row of HX tubes 802 of the example comprises 9 HX tubes 808 while the second row the HX tubes 804 of the example comprises 8 HX tubes 808, but in alternate embodiments greater or fewer numbers of HX tubes can be used. The first row of HX tubes 802 is set off or staggered from the second row of HX tubes 804 such that the second row of HX tubes 804 partially fit into gaps left between the HX tubes 808 of the first row of HX tubes 802. In this example, the HX tubes 808 in the first row of HX tubes 802 and the second row of HX tubes 804 have the same configuration (V-shape bottom).

Figure 9:
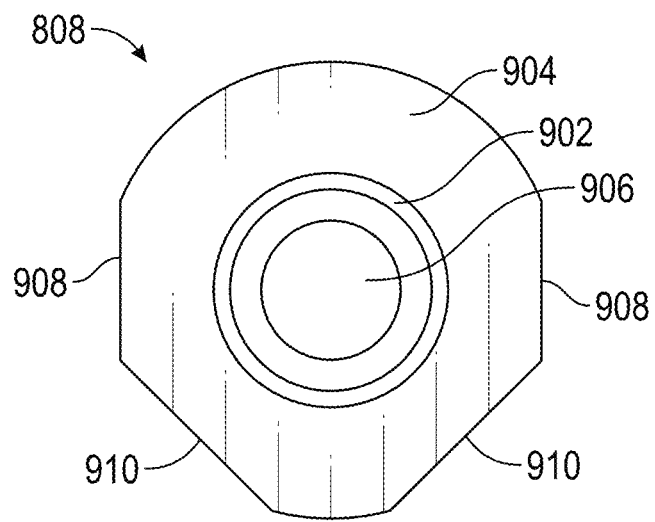
FIG. 9 is a cross-section of a heat exchanger tube from the heat exchanger slab of FIG. 8.

FIG. 9 is an HX tube 800 from FIG. 8. The HX tube 808 has a fluid impermeable tube 902 through which the water to be heated runs within the fluid passage 906. The tube 902 is surrounded by a plurality of fins 904 on the exterior of the tube 902 which extend from the tube 902 and run concentrically around the tube 902. In the example of FIG. 9, a majority of each fin is flat and defines a plane that is perpendicular to a longitudinal axis passing along the length of the tube 902. However, the outer circumference of each fin 904 in the plurality of fins comprises a pattern of bends that deviate from the plane defined by the majority of each fin. In the example of FIG. 9, the pattern of bends comprises a bend at four areas on the same position of each fin, such that the bends form four flat areas that run along the length of the heat exchanger tube. Two of the flat areas are side flat areas 908 which allows each HX tube 808 to be set directly next to an adjacent HX tube 808 such that the side flat areas 908 align. HX tube 808 also comprises two bottom flat edges 910 which form a V-like shape at the bottom of the HX tube 808. This V-like shape allows for the HX tubes 808 of the second row of HX tubes 804 to be off set from the HX tubes 808 the first row of HX tubes 802 such that the second row of HX tubes 804 fit into gaps left between the HX tubes 808 of the first row of HX tubes 802. As the water moves through the HX tubes 808 heat is transferred from the combustion fluid flowing over the exterior of the HX tubes 808 into the fin 904 and/or tube 902 and then into the water running through the tube 902, thus, heating the water.

Figure 10:
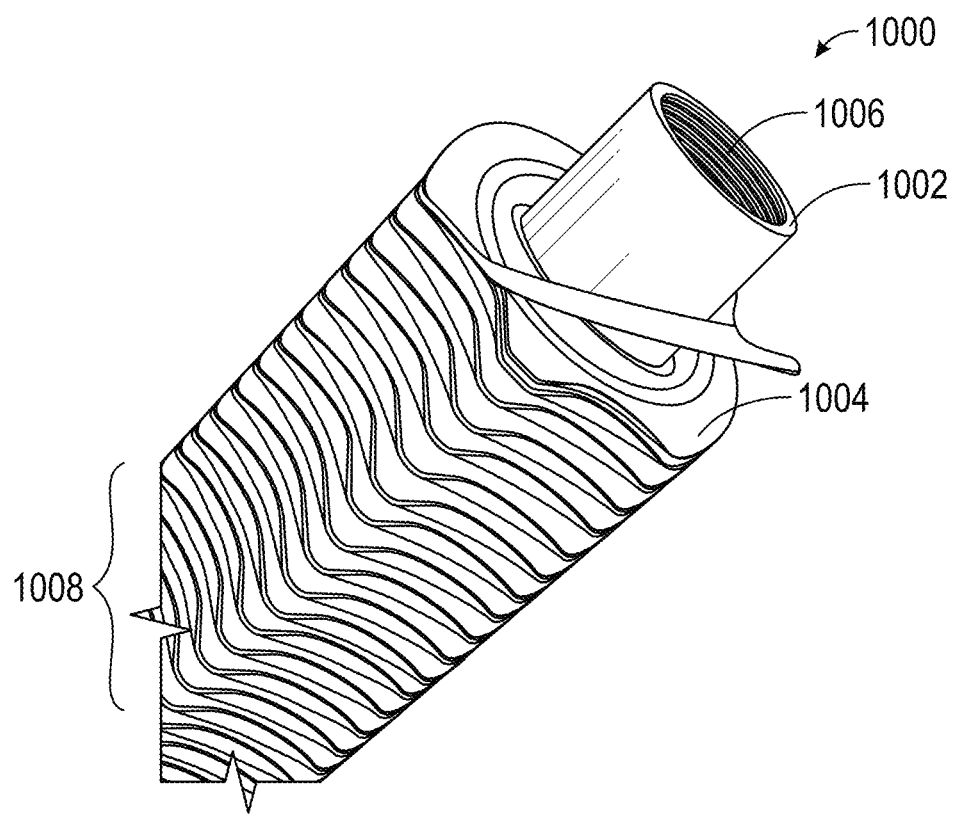
FIG. 10 is a photograph of an example heat exchanger tube of the disclosure.
Figure 11:
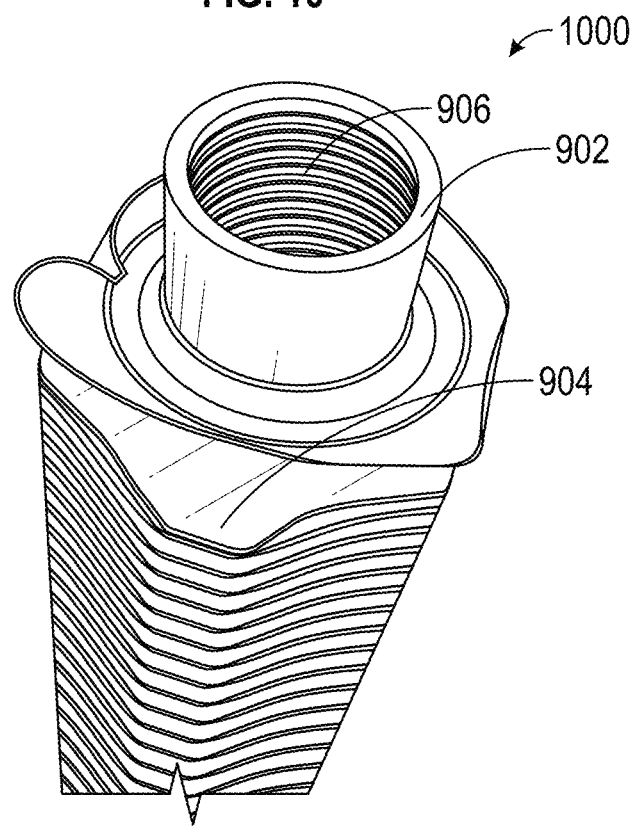
FIG. 11 is a photograph of another view of the example heat exchanger tube of FIG. 10.

FIGS. 10 and 11 are photographs of an example HX tube 1000 comprising four flat areas 1008. The bottom two flat areas form a V-like shape. The HX tube 1000 comprises a fluid passage 1006, a tube 1002, and a plurality of fins 1004.

In embodiments, the tube and/or fins are made of a material which transfers heat efficiently, such as copper and/or copper nickel. In some embodiments, the tube and tube and/or fins are made of steel. In some embodiments, the outer circumference of the fins of the HX tubes where the bends are located can be flat or concave. The bends in each of the adjacent fins do not touch any other adjacent fins or the bends of any other adjacent fins. In some embodiments, the plurality of fins on the tube refers to individual fins that are wrapped around the circumference of the tube. In other embodiments the plurality of fins on the tube refers to a single piece of spiraling metal that is wrapped around the tube creating fins. In some embodiments the fins are extruded from the same tube in a spiral fashion. In this disclosure, a plurality of fins refers to the fins along a longitudinal side of the tube, even though the fins are made up of the same piece of metal.

In some embodiments, the pattern of bends in the plurality of fins that create a flat or concave area are bent at an angle. In some embodiments, the angle relative the majority of the fin that is flat and defines a plane is 5-10, 10-15, 15-20, 50-25, 25-30, 30-35, 35-40, 40-45, 45-50, 50-55, 55-60, 60-65, 65-70, 70-75, 75-80, 80-85, or 85-90 degrees. In some embodiments, the bends are positioned at a certain location between the tube and the exterior circumference of the fin. For example, the bend can be positioned such that the middle of the bend falls between 10%-20%, 20-30%, 30-40%, 40-50%, 50-60%, 60-70% or 70-80% of the distance between the circumference of the fin and the tube (width of the fin). It should be understood that the number of bends in the pattern of bends in each fin can vary from one to many bends. Additionally, the direction of the bends in the fin can vary such that one bend is oriented in a first direction and a second bend is oriented in a different or opposite direction.

In embodiments, crushing the fins at the desired width and angle gives the opportunity to increase the efficiency while operating in a compact heat exchanger design. Crushing the fins increases the amount of heat transfer material that can be placed within the heat exchanger. For example, by bending the fins, an extra HX tube can fit into a row in a slab.

In embodiments, the crushing of the fins allows for the gases to be directed in a way that there is more heat transfer from the combustion fluid to the heat exchanger tubes which in turn increases the thermal efficiency of the heat exchanger. As one example, the pattern of bends in the fins along each heat exchanger tube can slow the combustion fluid flowing over the exterior of the heat exchanger tubes thereby increasing heating efficiency. In some embodiments, the design and arrangement of the tubes increases efficiency by 1.5%.

In some embodiments, the HX tubes of an HX slab could be arranged in one, two, three, four, or more rows, depending on the efficiency required from the unit. In a specific embodiment, the HX slab comprises two rows. In some embodiments of the disclosure each row in a HX slab could comprise the same number of HX tubes. In some embodiments, each row in an HX slab could comprises a different number of HX tubes than another row of the HX slab. In some embodiments, the HX slab rows comprise between 5-20 HX tubes in each row. In embodiments, the HX slab can comprise between 2-6 rows of HX tubes. In a certain embodiment, the HX slab comprises 9 tubes in a first row and 8 tubes in a second row. In some embodiments, the HX slab can include a combination of tubes that do not have fins, tubes that do have fins, and tubes with bent fins. That is, a HX slab could include a first row comprising, in order, 3 HX tubes with bent fin, three HX tubes without any fins, and two HX tubes with bent fins. The second row could comprise 9 HX tubes with bent fins. Embodiments of the disclosure include any combination of HX tubes with no fins, with fins, and with bent fins, as long as the HX slab includes at least one HX tube with bent fins.

In the non-limiting examples illustrated in FIGS. 1-9, the water heater is a down fired water heater where the burner is located near the top of the water heater. In contrast, up fired water heaters have the burner located near the bottom of the water heater. Down fired water heaters can provide an advantage over up fired water heaters in that, if condensation occurs, the condensation does not drip downward onto the burner as can be the case in up fired water heaters. Condensation is typically acidic and condensation that drips downward onto an up fired burner can cause damage to the burner.

In some embodiments, the water heater is a non-condensing unit. That is, the water heater has a thermal efficiency of 84% or less. In some embodiments, the water heater has a thermal efficiency of 83-84%. In some embodiments, the water heater is a pool water heater. In specific embodiments, the water heater is a residential pool water heater. In some embodiments, the water heater is a gas fired water heater. In some embodiments, the compact design of the heat exchanger tubes reduces the overall size of the unit so that the entire water heater unit is 24 inches by 24 inches by 24 inches or less. In embodiments, using the HX tubes described herein versus tubes without patterns of bends in the fins of the heat exchanger tubes increase the efficiency of a water heater from 82% to 84%.

Figure 12:
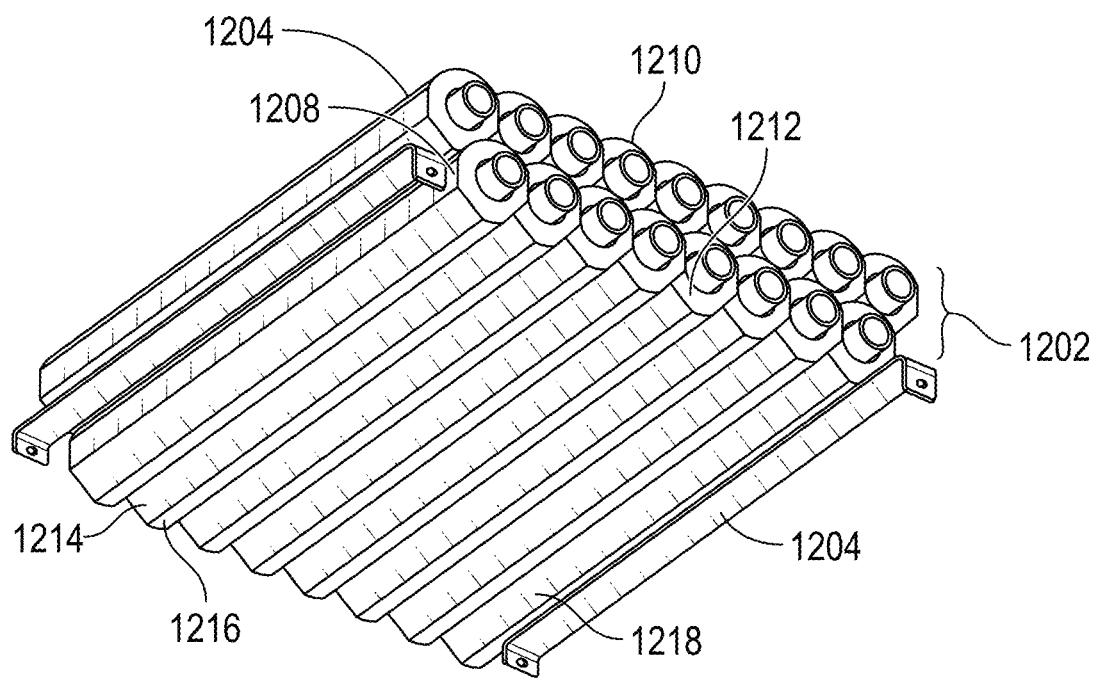
FIG. 12 is an example heat exchanger slab resting on a baffle.

FIG. 12 illustrates a HX slab 1202 with a baffle 1204. The first row 1204 of the HX slab 1202 rests on top of the second row 1208 of the HX slab 1202, where each HX tube 1212 of the second row 1208 rests between the HX tubes 1210 of the first row 1204 of the HX slab 1202. Each HX tube 1212 of the second row 1208 rests within a groove 1214 of the baffle 1204. That is, the baffle is plate which is corrugated such that there are grooves 1214 and ridges 1216 which run parallel to each other along a length of the baffle 1204. The grooves 1214 and ridges 1216 of this example come to a slight point at each groove 1214 and ridge 1216, forming a V-shape at each. The baffle 1204 also comprises slits 1218 that run along a portion of the groove 1214 of the baffle 1204. The baffle 1204 regulates the flow of combustion fluid that flows around the exterior of the HX tubes of rows 1204 and 1208, and then flows through the slits in the baffle. After the combustion fluid moves through the slits 1218 of the baffle 1214, the combustion fluid is then vented.

Figure 6:
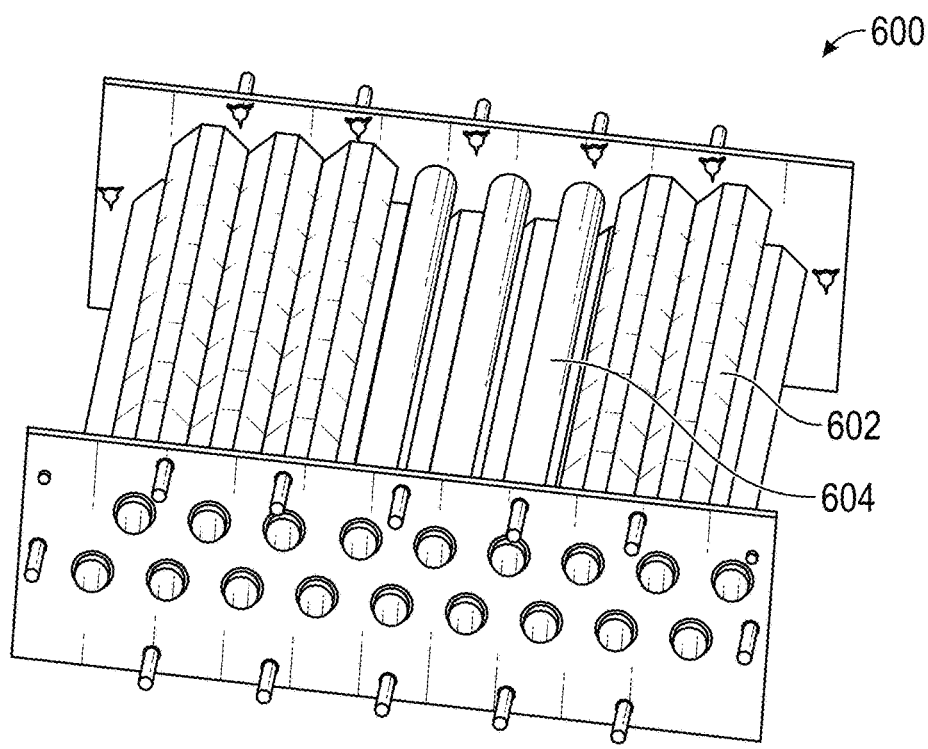
FIG. 6 is an example HX tube slab assembly.

FIG. 6 illustrates another example of a HX slab assembly 600 which comprises two different types of HX tubes. The majority of the HX tubes are HX tubes comprising bent fins 602. There are three additional HX tubes that do not comprise fins and consist essentially of a tube 604.

Figure 13:
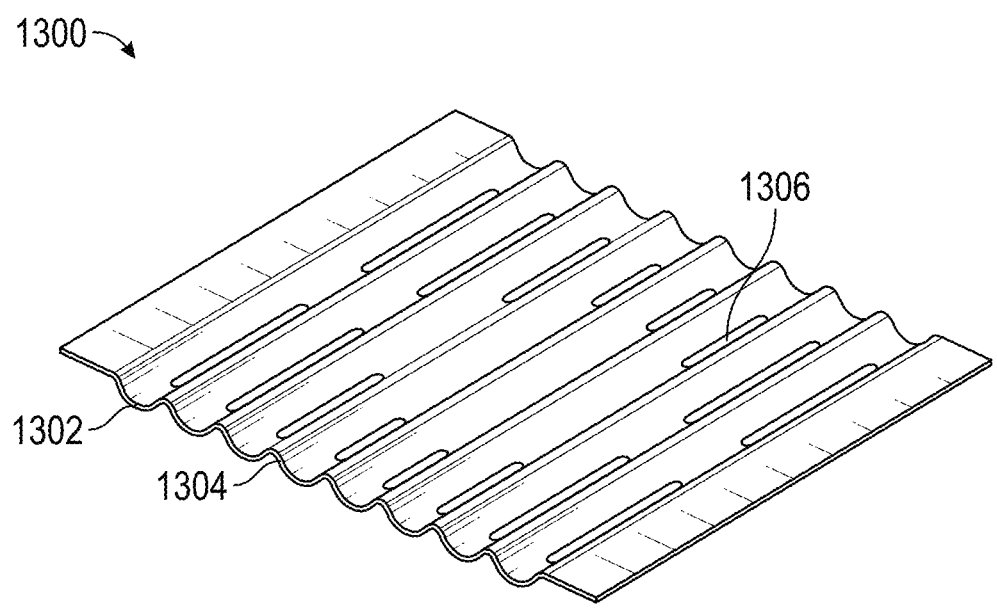
FIG. 13 is an example baffle comprising U-shape groves.

FIG. 13 shows another example baffle 1300. The baffle 1300 comprises grooves 1302 and ridges 1304. The grooves 1302 in this example form a U-shape, while the ridges 1304 form a V-shape. Slits 1306 are formed in the valleys of the grooves 1302.

Figure 7:
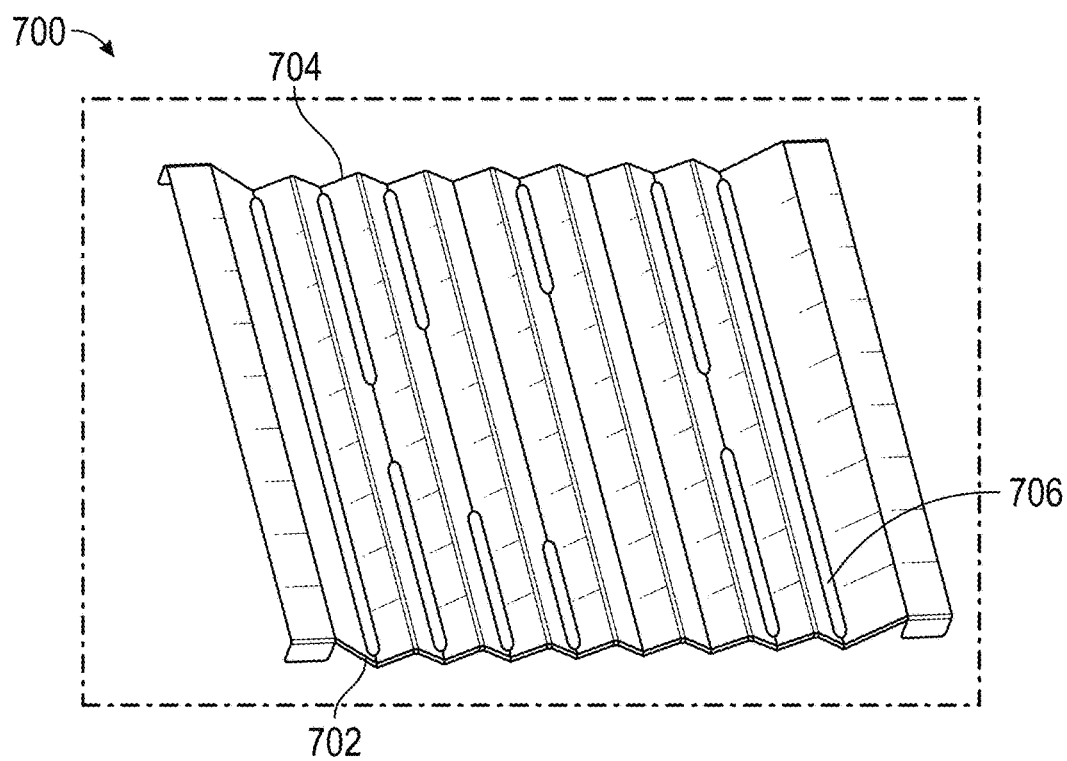
FIG. 7 is an example baffle.

FIG. 7 is another example of a baffle 700. The baffle 700 comprises grooves 702 and ridges 704. Both the grooves 702 and ridges 704 are formed in a V-shape. Slits 706 are formed in the valleys of the grooves 702.

Baffle, as used herein, refers to a device, such as a plate or screen, used to regulate the flow of fluid. In certain example embodiments, the baffle is configured to guide the gases through the heat exchanger and to improve the distribution of gases across the heat exchanger. In certain example embodiments, the baffle is configured to increase the efficiency of the heat exchanger by increasing the residence time of combustion fluid near the HX tubes and, thus, increasing heat transfer to the HX tubes. In certain embodiments, the baffle is configured to help control the direction of the flue gases to the vent, thus, preventing the preferential inclination of the gases to any one side. The design of the baffle may change depending on the design of the burner.

In certain example embodiments, the slits of the baffle are located within the grooves of the baffle. The slits can be modified to whatever length and opening desired based on the heat balance requirements. In some embodiments, the slits are of the same or different lengths. In some embodiments, the slits are of the same or different widths. In some embodiments, the slits are positioned symmetrically. In some embodiments, the slits are positioned asymmetrically. In some embodiments, the grooves of the baffle are V-shape, U-shape, or both. In some embodiments, the ridges are V-shape, U-shape, or both. In some embodiments, the baffle is made of stainless steel or carbon steel. In some embodiments, the length of the slits of the baffle are between 10% to 98%, such as 98-90%, 90-80%, 80-70%, 70-60%, 60-50%, 60-45%, 45-40%, 40-35%, 35-30%, 30-25%, 25-20%, 20-15%, or 15-10% the width of the baffle. In some embodiments, the length of the slits varies from one side of the baffle to the other, such that a middle of the baffle has no slits (see FIG. 13). That is, the slits closer to the edge of the baffle that is parallel to the slits are longer than the slits located in the middle of the baffle.

In some embodiments, the HX tubes in a row of the HX slab touch each other. In some embodiments, HX tubes in a row of the HX slab do not touch each other. In some embodiments, HX tubes between rows of HX tubes in an HX slab touch each other. In some embodiments, HX tubes between rows of HX tubes in an HX slab do not touch each other. In some embodiments, the row of HX tubes adjacent to a baffle do not touch the baffle. In some embodiments, the row of HX tubes adjacent to a baffle touch the baffle.

As shown below, HX tubes and baffle of the disclosure result in increased efficiency and improved heat transfer while maintaining the unit as non-condensing and compact. The use of the configurations disclosed here, including HX slabs with flattened HX tubes and a baffle, can result in a unit that is less than 2 ft by 2 ft×2 ft and increasing efficiency from 82% to 84%. The flattened fins allow more thermal transfer material to be located in the same amount of space, resulting in increased heat transfer efficiencies.

By carefully engineering the various characteristics the flattened fin sections and the baffle in water heaters and engineering the positioning of the tubes and the flattened fins, the flow of combustion fluid around the HX tube can become more efficient while still using materials that are thought to be less efficient but more cost effective, providing a number of benefits, including but not limited to lower fuel consumption, lower costs, less material, less waste, and a more compact footprint. Example configurations can further allow a heat exchanger to comply with any applicable standards and/or regulations. Example embodiments can be mass produced or made as a custom order.

Accordingly, many modifications and other embodiments set forth herein will come to mind to one skilled in the art to which example water heaters pertain having the benefit of the teachings presented in the foregoing descriptions and the associated drawings. Therefore, it is to be understood that example water heaters are not to be limited to the specific embodiments disclosed and that modifications and other embodiments are intended to be included within the scope of this application. Although specific terms are employed herein, they are used in a generic and descriptive sense only and not for purposes of limitation.

Example 1

Figure 14A:
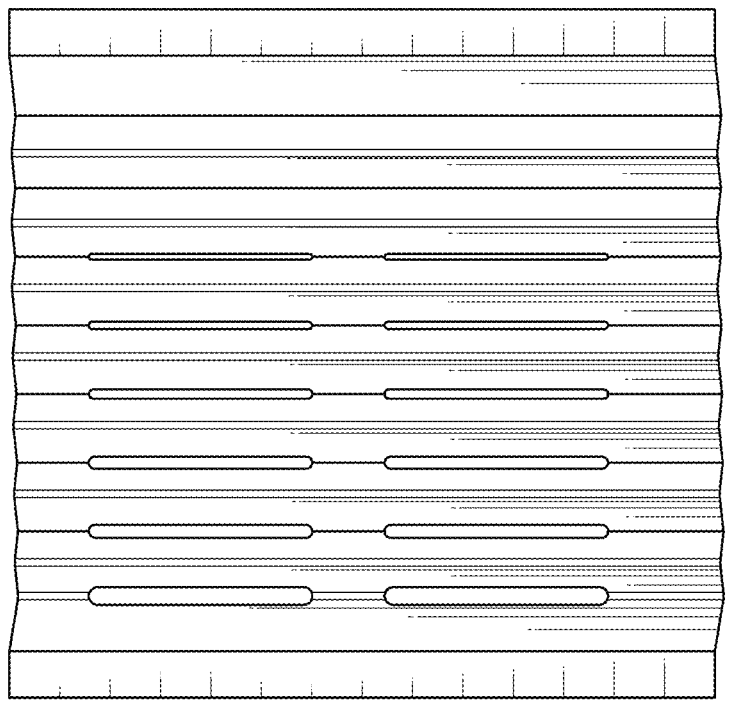
FIG. 14*a* is an example baffle.
Figure 14B:
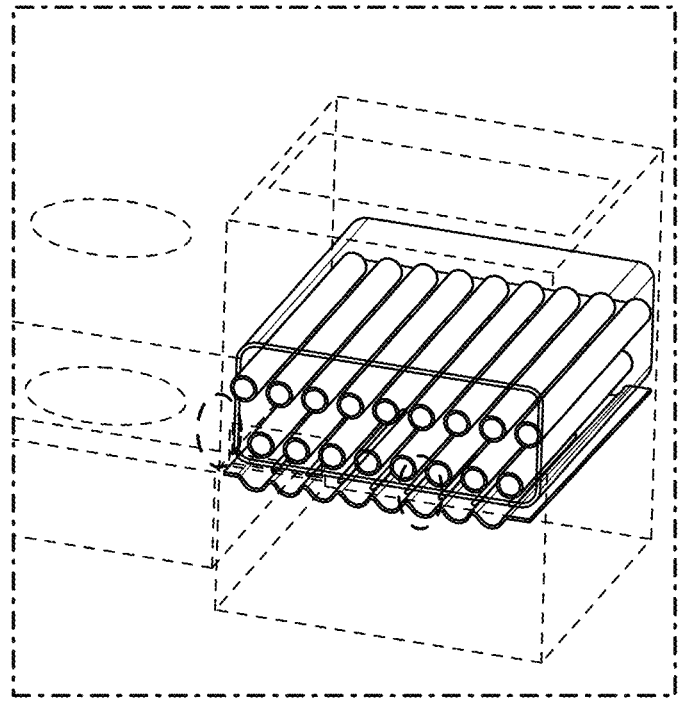
FIG. 14*b* is the thermal image of the heat exchanger slab that results from the use of the baffle in FIG. 14*a*.
Figure 15A:
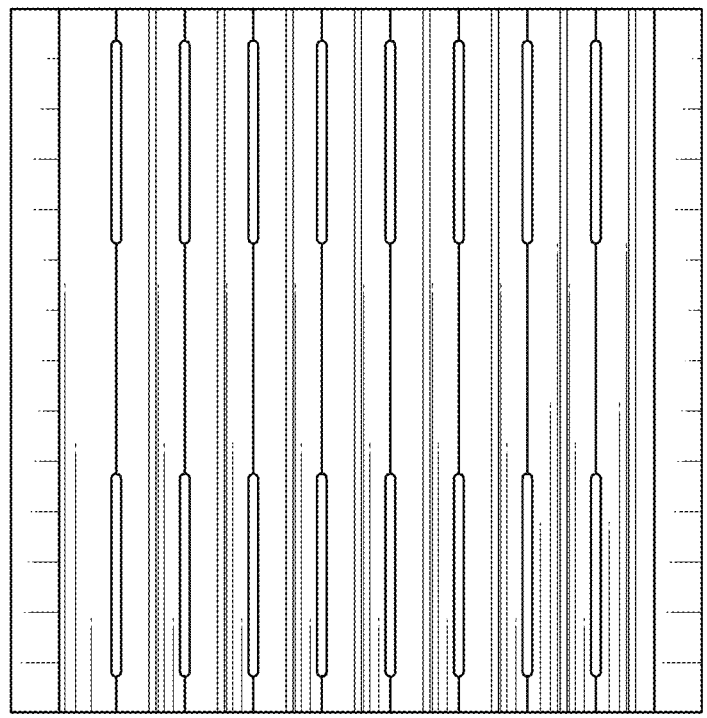
FIG. 15*a* is an example baffle.
Figure 15B:
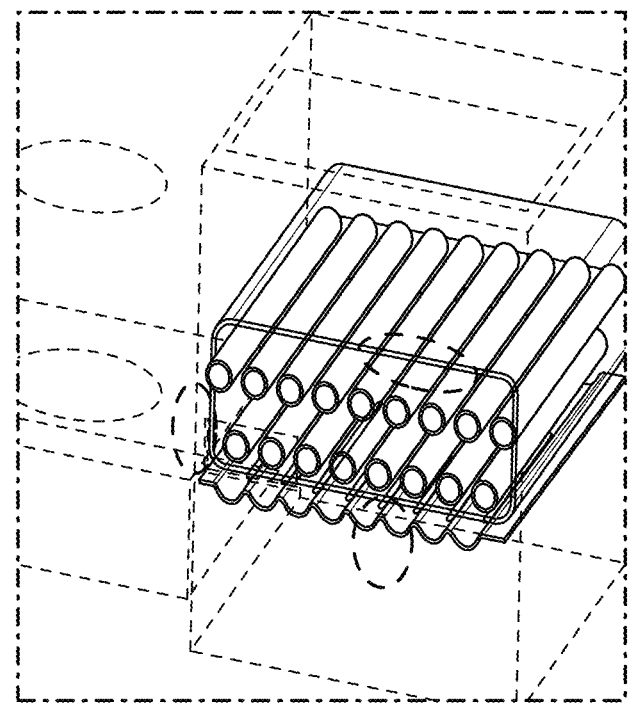
FIG. 15*b* is the thermal image of the heat exchanger slab that results from the use of the baffle in FIG. 15*a*.
Figure 16A:
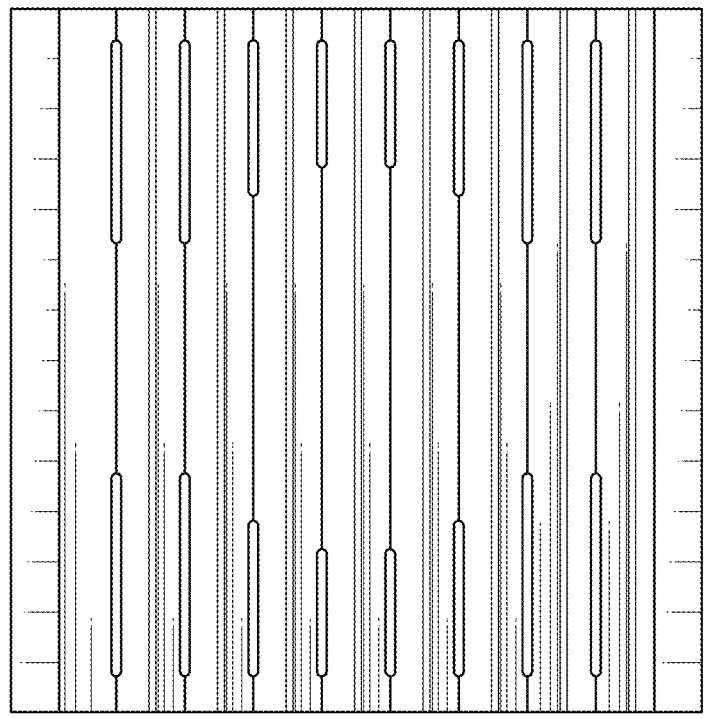
FIG. 16*a* is an example baffle.
Figure 16B:
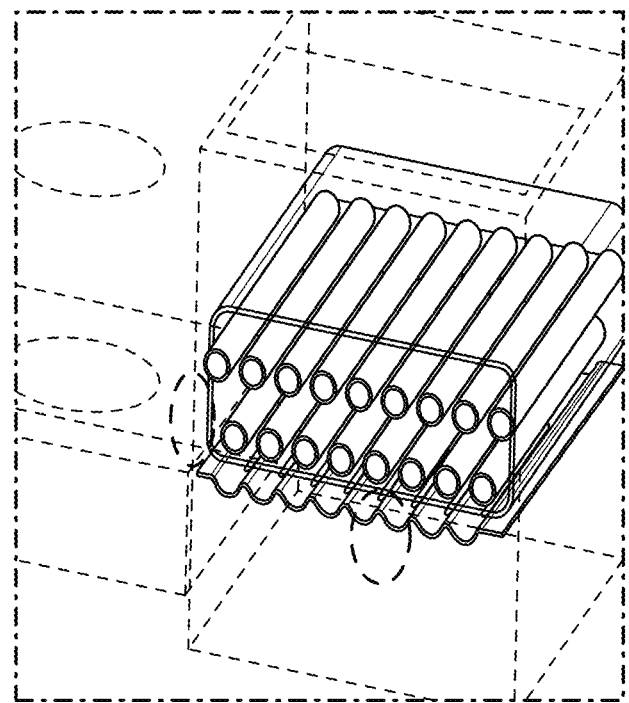
FIG. 16*b* is the thermal image of the heat exchanger slab that results from the use of the baffle in FIG. 16*a*.

Three different configurations of baffles were tested with a compact down-fired slab heat exchanger pool water heater. The three baffles are shown in FIGS. 14a, 15a, and 16a with corresponding thermal images with the water heater in use shown in FIGS. 14b, 15b, and 16b. The baffle of FIG. 16a demonstrated a good distribution of heat over the heat exchanger tubes in that there is no significant concentration of heat. In contrast, FIGS. 14b and 15b show circled areas of high heat concentration "hot spots" in the thermal images.

Example 2

Figure 17A:
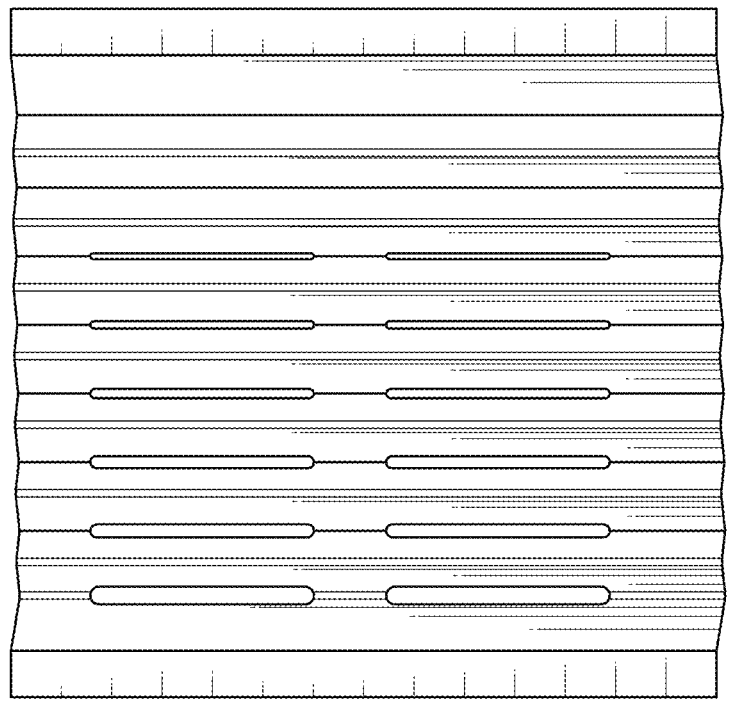
FIG. 17*a* is an example baffle.
Figure 17B:
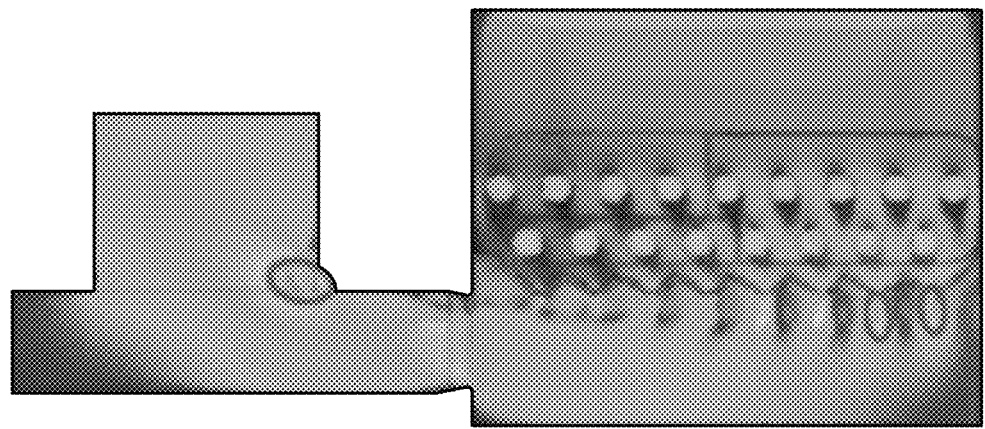
FIG. 17*b* is the thermal image of the heat exchanger and vent that results from the use of the baffle in FIG. 17*a*.
Figure 18A:
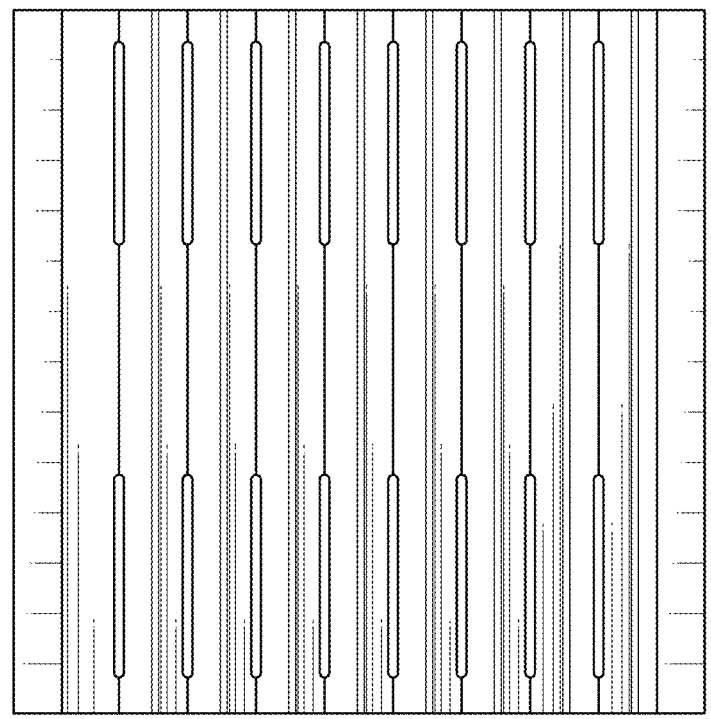
FIG. 18*a* is an example baffle.
Figure 18B:
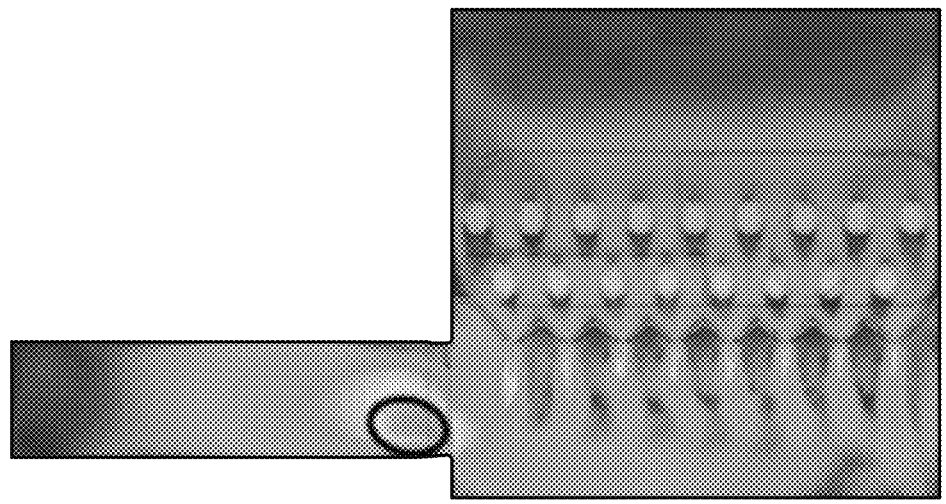
FIG. 18*b* is the thermal image of the heat exchanger and vent that results from the use of the baffle in FIG. 18*a*.
Figure 19A:
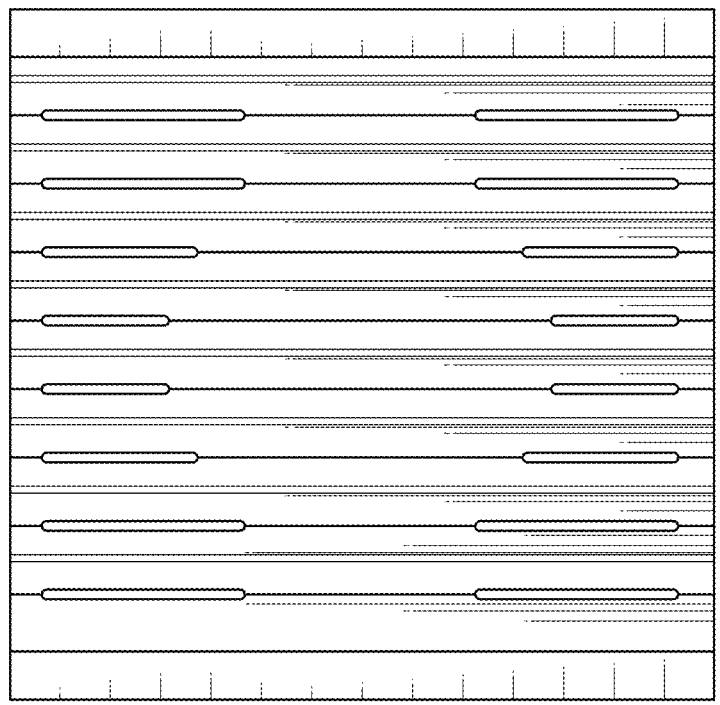
FIG. 19*a* is an example baffle.
Figure 19B:
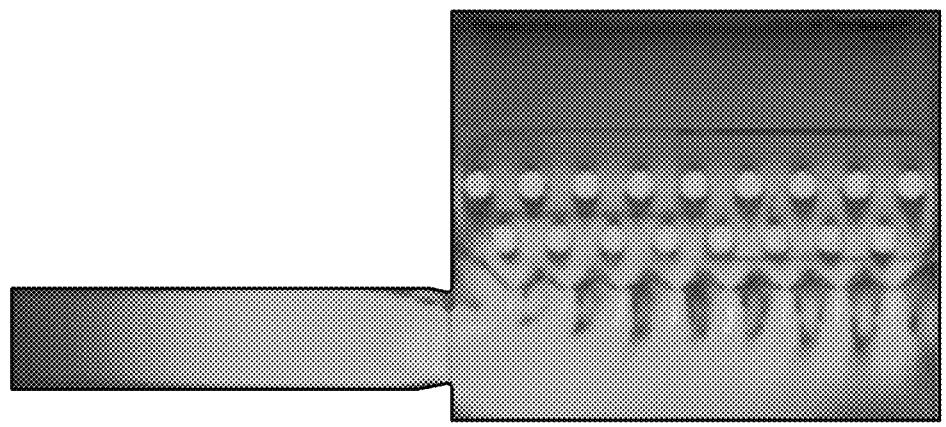
FIG. 19*b* is the thermal image of the heat exchanger and vent that results from the use of the baffle in FIG. 19*a*.

Three different configurations of baffles were tested with a compact down-fired slab heat exchanger water heater. The three baffles are shown in FIGS. 17a, 18a, and 19a with corresponding thermal images with the water heater in use shown in FIGS. 17b, 18b, and 19b. The baffle of FIG. 19a demonstrated a good distribution of flowing air into the vent which occurred without areas of heat concentration "hot spots". In contrast, FIGS. 17b and 18b show circled areas of high heat concentration "hot spots" in the thermal images.

That which is claimed is:

1. A water heater comprising:
   a burner;
   an exhaust vent; and
   a heat exchanger comprising:
      a first set of heat exchanger tubes arranged in a first row, the first set of heat exchanger tubes comprising a first heat exchanger tube having a first fin with a first curved outer surface, and a second heat exchanger tube having a second fin with a second curved outer surface; and
      a second set of heat exchanger tubes arranged in a second row, the second set of heat exchanger tubes comprising a third heat exchanger tube having a third fin that is at least partially formed with a first angled surface and a second angled surface;
      wherein the third heat exchanger tube is arranged such that the third fin is disposed at least partially between the first curved outer surface and the second curved outer surface,
      wherein the first set of heat exchanger tubes has a first number of heat exchanger tubes, and the second set of heat exchanger tubes has a second number of heat exchanger tubes that is greater than the first number of heat exchanger tubes, and
      wherein each heat exchanger tube of the first set of heat exchanger tubes has a first geometrical configuration, and each heat exchanger tube of the second set of heat exchanger tubes has the first geometrical configuration.

2. The water heater of claim 1, wherein the first fin of the first heat exchanger tube further comprises:
   a first flat side surface; and
   a second flat side surface;
   wherein a first end of the first curved outer surface is adjacent to the first flat side surface, and a second end of the first curved outer surface is adjacent to the second flat side surface.

3. The water heater of claim 1, wherein the second row is an upper row and the first row is a lower row.

4. The water heater of claim 1, wherein the third fin of the third heat exchanger tube further comprises:
   a flat surface disposed between the first angled surface and the second angled surface;
   wherein the flat surface forms a lower portion of the fin.

5. The water heater of claim 4, wherein the first angled surface and the second angled surface each have a first width, and the flat surface has a second width that is less than the first width.

6. The water heater of claim 1, wherein the first set of heat exchanger tubes and the second set of heat exchanger tubes are arranged in an offset configuration.

7. The water heater of claim 1, further comprising:
   a baffle comprising a first end plate and a second end plate.

8. The water heater of claim 7, wherein an air gap separates the fin from the baffle.

9. The water heater of claim 8, wherein the baffle is a corrugated baffle comprising a first groove and a second groove.

10. The water heater of claim 9, wherein the corrugated baffle comprises a first slit having a first length and a second slit having a second length that is less than the first length; and
    wherein the first slit is disposed along the first groove and the second slit is disposed along the second groove, and
    wherein the second groove is closer to a center of the corrugated baffle than the first groove.

11. The water heater of claim 10, wherein the corrugated baffle is solid along a first edge and along a second edge, the first edge and the second edge being parallel to the first groove.

12. The water heater of claim 7, wherein the first end plate and the second end plate are discrete components positioned at opposite ends of the first row or the second row.

13. A water heater comprising:
    a heat exchanger comprising:
       a first set of heat exchanger tubes arranged in a first row, the first set of heat exchanger tubes comprising a first heat exchanger tube having a first fin with a first curved outer surface, and a second heat exchanger tube having a second fin with a second curved outer surface;
       a second set of heat exchanger tubes arranged in a second row, the second set of heat exchanger tubes comprising a third heat exchanger tube having a third fin that is at least partially formed with a first angled surface and a second angled surface; and
       a corrugated baffle comprising a first slit having a first length and a second slit having a second length that is less than the first length;
       wherein the third heat exchanger tube is arranged such that the third fin is disposed at least partially between the first curved outer surface and the second curved outer surface, and
       wherein the first set of heat exchanger tubes has a first number of heat exchanger tubes, and the second set of heat exchanger tubes has a second number of heat exchanger tubes that is greater than the first number of heat exchanger tubes.

14. The water heater of claim 13, wherein the first fin of the first heat exchanger tube further comprises:
    a first flat side surface; and
    a second flat side surface;
    wherein a first end of the first curved outer surface is adjacent to the first flat side surface, and a second end of the first curved outer surface is adjacent to the second flat side surface.

15. The water heater of claim 13, wherein each heat exchanger tube of the first set of heat exchanger tubes has a first geometrical configuration, and each heat exchanger tube of the second set of heat exchanger tubes has the first geometrical configuration.

16. The water heater of claim 13, wherein the first set of heat exchanger tubes and the second set of heat exchanger tubes are arranged in an offset configuration.

17. A water heater comprising:
    a heat exchanger comprising:
       a first set of heat exchanger tubes arranged in a first row, the first set of heat exchanger tubes comprising a first heat exchanger tube having a first fin with a first curved outer surface, and a second heat exchanger tube having a second fin with a second curved outer surface; and
       a second set of heat exchanger tubes arranged in a second row, the second set of heat exchanger tubes comprising a third heat exchanger tube having a third fin that is at least partially formed with a first angled surface and a second angled surface;

wherein the third heat exchanger tube is arranged such that the third fin is disposed at least partially between the first curved outer surface and the second curved outer surface,
wherein the first set of heat exchanger tubes has a first number of heat exchanger tubes, and the second set of heat exchanger tubes has a second number of heat exchanger tubes that is greater than the first number of heat exchanger tubes, and
wherein the first set of heat exchanger tubes and the second set of heat exchanger tubes are arranged in an offset configuration.

\* \* \* \* \*